United States Patent
Groth et al.

(10) Patent No.: US 6,806,340 B2
(45) Date of Patent: Oct. 19, 2004

(54) POLYURETHANE COATINGS, BASED ON POLYISOCYANATES CONTAINING URETDIONE AND/OR OXADIAZINETRIONE GROUPS

(75) Inventors: Stefan Groth, Leverkusen (DE); Detlef-Ingo Schütze, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/204,978

(22) PCT Filed: Feb. 15, 2001

(86) PCT No.: PCT/EP01/01654

§ 371 (c)(1),
(2), (4) Date: Aug. 27, 2002

(87) PCT Pub. No.: WO01/64767

PCT Pub. Date: Sep. 7, 2001

(65) Prior Publication Data

US 2003/0032756 A1 Feb. 13, 2003

(30) Foreign Application Priority Data

Feb. 28, 2000 (DE) .......................... 100 09 407

(51) Int. Cl.$^7$ .................. C09D 175/04; C08L 75/04; C08G 18/10; C08G 18/79; C08G 18/80

(52) U.S. Cl. .................. 528/45; 427/389; 427/389.9; 428/423.1; 428/423.4; 428/425.1; 528/65; 528/66; 528/67; 528/73

(58) Field of Search .................. 427/389, 389.9; 428/423.1, 423.4, 425.1; 528/45, 65, 66, 67, 73

(56) References Cited

U.S. PATENT DOCUMENTS

| | | | |
|---|---|---|---|
| 3,730,953 A | * 5/1973 | Naito et al. .................. 528/58 |
| 3,998,794 A | * 12/1976 | Muller et al. .................. 528/67 |
| 4,248,756 A | 2/1981 | König et al. .................. 528/45 |
| 4,448,947 A | * 5/1984 | Miyake et al. .................. 528/73 |
| 4,471,103 A | * 9/1984 | Miyake et al. .................. 528/65 |
| 4,474,934 A | 10/1984 | Tanaka et al. .................. 528/45 |
| 4,522,975 A | * 6/1985 | O'Connor et al. .......... 524/702 |
| 4,869,965 A | * 9/1989 | Gerum et al. ............ 428/425.9 |
| 6,624,282 B2 | * 9/2003 | Groth et al. .................. 528/65 |
| 6,710,151 B2 | * 3/2004 | Kuwatsuka et al. .......... 528/45 |

FOREIGN PATENT DOCUMENTS

| | | |
|---|---|---|
| EP | 0 490 158 | 7/1997 |
| EP | 0 789 017 | 8/1997 |
| EP | 0 825 209 | 2/1998 |

OTHER PUBLICATIONS

**Lass H.J. et al: "Zur Synthese Aliphatischer Polyisocyanate–Lackpolyisocyanate Mit Biuret–, Isocyanurat– Oder Uretdionstruktur the Synthesis of Aliphatic Polyisocyanates Containing Biuret, Isocyanurate or Uretdione Backbones for Use in Coatings" Journal Fur Praktische Chemie, Chemiker Zeitung, DE, Wiley VCH, Weinheim Bd, 336, Nr. 3, 1994, Seiten 185–200, XP000441642 ISSN: 1436–9966 Seite 196—Seite 198.

* cited by examiner

*Primary Examiner*—Rabon Sergent
(74) *Attorney, Agent, or Firm*—Joseph C. Gil; Gary F. Matz; Thomas W. Roy

(57) ABSTRACT

Polyurethane coatings which are the reaction product of A) an aliphatic, isocyanate-containing prepolymer having an isocyanate content of 1–8 wt. % and a free monomeric diisocyanate content of less than 2 wt. %, and containing 0.1 to 1.5 moles of per 1000 g of prepolymer of aliphatically bound uretdione and oxadiazinetrione groups, and B) a polyol component B) comprising at least 50 equivalent % of a compound corresponding to the formula

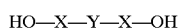

HO—X—Y—X—OH where

Y represents methylene, ethylene, —C≡C—, cyclohexylene-1,4, -1,3, -1,2, or phenylene-1,4, -1,3, -1,2 and X represents methylene, —OCH$_2$CH$_2$— (the oxygen being bound to the Y), or cyclohexylene-1,4, -1,3, -1,2, and where the equivalent ratio of the free NCO groups to isocyanate-reactive groups is 0.90 to 1.5. The coatings are applied to flexible substrates such as textile or leather by the casting or knife coating process by means of reactive compositions.

14 Claims, No Drawings

POLYURETHANE COATINGS, BASED ON POLYISOCYANATES CONTAINING URETDIONE AND/OR OXADIAZINETRIONE GROUPS

BACKGROUND OF THE INVENTION

The invention relates to polyurethane coatings which may be prepared, e.g., by the casting or knife coating process on flexible substrates such as textile or leather by means of reactive compositions (reactive binders) based on isocyanate-containing compounds and polyols.

Solvent-free and low-solvent reactive compositions based on NCO prepolymers for the preparation of polyurethane coatings on flexible substrates are well known. For example, a process for the preparation of polyurethane coatings is described in EP-A 0 490 158 which is characterised by high reactivity. In view of its high reactivity, such a process is suitable only for spray applications and may not be used in the casting or knife coating process due to its very short pot life. Systems based on blocked polyisocyanates, on the other hand, are suitable for such coating processes, such as, e.g., the combination of blocked NCO prepolymers and cycloaliphatic diamines. In this case a ketoxime-blocked NCO prepolymer based on aromatic polyisocyanates is mixed with a diamine as chain extender and then cured by a heat treatment with cleavage of the ketoxime and optionally evaporation of the solvent. Reactive compositions of this kind for coating flexible substrates are described, e.g., in DE-A 2 902 090. When the systems described are cured, cleavage of the ketoxime therefore takes place, entailing a waste air treatment even when the systems contain no solvents.

EP-A 0 825 209, on the other hand, describes reactive binders free from cleavage products which, in view of their favourable reaction kinetics and very good mechanical film properties, are outstandingly suitable for coating textiles and other flat substrates. A disadvantage is that the preparation of reactive binders with a low monomer content is technically more complex (monomer separation by thin film distillation).

The object of the present invention was, therefore, to provide polyurethane coatings which may be obtained from reactive binders with a low monomer content which can be prepared without monomer separation.

Surprisingly, by combining certain polyisocyanate prepolymers containing uretidione or oxadiazine trione groups and certain diol chain extenders, it is possible to obtain coatings with good mechanical properties which meet the requirements for the coatings of flexible substrates such as, for example, textile, and therefore achieve this object.

SUMMARY OF THE INVENTION

The invention provides, therefore, polyurethane coatings which are characterised in that they may be obtained by reaction of aliphatic, isocyanate-containing prepolymers A) with a polyol component B), wherein the prepolymers A)
based on solids, contain 1–8 wt. % of NCO, have a free monomeric diisocyanate content of less than 2% and contain from 0.1 to 1.5 mole of aliphatically bound uretidione (I) and/or oxadiazine trione groups (II) per 1000 g of prepolymer

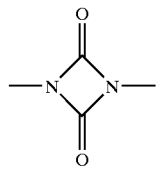

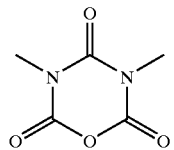

and the polyol component B)
is composed of at least 50 equivalent %, based on the groups which are reactive towards isocyanate, of compounds corresponding to the formula $$HO-X-Y-X-OH \qquad (III)$$

wherein
Y means methylene, ethylene, —C≡C—, cyclohexylene-1,4, -1,3, -1,2, phenylene-1,4, -1,3, -1,2 and
X means methylene, —OCH$_2$CH$_2$— (the oxygen being bound to the Y), cyclohexylene-1,4, -1,3, -1,2,
and
wherein the equivalent ratio of the free NCO groups of A to the NCO-reactive groups of B is 0.90 to 1.50, optionally with the use of conventional auxiliaries and additives, the use thereof for coating flexible substrates such a textile or leather, and processes for coating said substrates, e.g., by casting or knife coating followed by heat treatment, and the coated substrates themselves.

DETAILED DESCRIPTION OF THE INVENTION

The term "average molecular weights" used below means in each case molecular weights determined as a number-average.

Preferred NCO prepolymers A) have average molecular weights from 1200 to 10,000, preferably from 1500 to 8000. The free NCO content is preferably between 1.5 and 7 wt. %, particularly preferably between 2.0 and 5.0%. The monomeric diisocyanate content (diisocyanates having no other heteroatoms) is preferably below 0.5%. Preferred NCO prepolymers A) have an average NCO functionality from 2.0 to 3.0, preferably 2.1 to 2.8.

The NCO prepolymers A) may be prepared by reaction of organic polyisocyanates a) containing uretidione and/or oxadiazine trione groups and optionally other polyisocyanates b) with compounds c) which are reactive towards NCO.

The industrially available aliphatic polyisocyanates a) containing uretidione groups are usually mixtures which may contain both isocyanurate, iminooxadiazine dione, allophanate or biuret structures. An example of such a product is Desmodur® N 3400 (Bayer A G, DE), a polyisocyanate based on hexamethylene diisocyanate which, apart from uretidione groups, contains mainly isocyanurate groups and thus has an average NCO functionality of about 2.5. Polyisocyanates containing uretidione groups based on hexamethylene diisocyanate are used in preference.

Polyisocyanates containing oxadiazine trione groups are described, for example, in DE-A 1 670 666 and EP-A 0 081

712. 3,5-bis-[6-isocyanatohexyl]-1,3,5-oxadiazine-2,4,6-trione is preferred, which product is formed by addition of one mole of carbon dioxide and 2 mole of hexamethylene diisocyanate and may be prepared according to DE-A 1 670 666.

Polyisocyanates containing uretidione groups and polyisocyanates containing oxadiazine trione groups are preferably used in mixture, the molar ratio of oxadiazine trione groups to uretidione groups being preferably 1.0 to 5.0, particularly preferably 2.0 to 4.0.

Other suitable organic polyisocyanates b) include aliphatic, cycloaliphatic and aromatic polyisocyanates. Examples of suitable polyisocyanates b) include compounds corresponding to the formula $Q(NCO)_n$ with an average molecular weight below 800, wherein n means a number from 2 to 4 and Q means an aliphatic $C_4$-$C_{12}$ hydrocarbon radical or a cycloaliphatic $C_6$-$C_{15}$ hydrocarbon radical, for example, diisocyanates from the series comprising 4,4'-diisocyanatodicyclohexylmethane, 3-isocyanatomethyl-3,5,5-trimethylcyclohexylisocyanate (isophorone diisocyanate=IPDI), tetramethylene diisocyanate, hexamethylene diisocyanate (HDI), 2-methyl-pentamethylene diisocyanate, 2,2,4-trimethylhexamethylene diisocyanate (THDI), dodecamethylene diisocyanate 1,4-diisocyanatocyclohexane, 4,4'-diisocyanato-3,3'-dimethyl-dicyclohexylmethane, 4,4'-diisocyanatodicyclohexylpropane-(2,2), 3-isocyanatomethyl-1-methyl-1-isocyanatocyclohexane (IMCI), 1,3-diisooctylcyanato-4-methyl-cyclohexane, 1,3-diisocyanato-2-methylcyclohexane and α,α,α',α'-tetramethyl-m or p-xylylene diisocyanate (TMXDI) and mixtures composed of said compounds. Moreover, polyisocyanates of the kind described, e.g., "Methoden der organischen Chemie" (Houben-Weyl), vol. 14/2, Georg Thieme-Verlag, Stuttgart 1963, pages 61 to 70 and in Liebigs Annalen der Chemie 562, pages 75 to 136, may also be used. Aromatic polyisocyanates such as 2,4- and 2,6-toluene diisocyanate, the industrial mixtures thereof or 2,4'- and 4,4'-diphenylmethane diisocyanates may also be used, but are less preferred. The use of aliphatic diisocyanates is particularly preferred, and more particularly preferably the use of 3-isocyanatomethyl-3,5,5-trimethyl-cyclohexylisocyanate (isophorone diisocyanate=IPDI).

Preferred NCO-reactive compounds c) are mainly polyols. Polyols used may be high molecular weight and also, to a lesser extent, low molecular weight hydroxyl compounds.

High molecular weight hydroxyl compounds include the hydroxypolyesters, hydroxypolyethers, hydroxypolythioethers, hydroxypolyacetals, hydroxypolycarbonates, dimer fatty alcohols and/or ester amides conventionally used in polyurethane chemistry, in each case with average molecular weights from 400 to 8000, preferably those with average molecular weights from 500 to 6500. Preferably, only diols are used because the branching is usually introduced by way of the polyisocyanate component a) or b).

Low molecular weight polyhydroxyl compounds include polyols with molecular weights from 62 to 399 conventionally used in polyurethane chemistry, such as ethylene glycol, triethylene glycol, tetraethylene glycol, propane 1,2- and 1,3-diol, butane 1,4- and 1,3-diol, hexane 1,6-diol, octane 1,8-diol, neopentyl glycol, 1,4-bis(hydroxymethyl)cyclohexane, bis(hydroxymethyl)tricyclo[5.2.1.0$^{2,6}$]decane or 1,4-bis(2-hydroxyethoxy)benzene, 2-methylpropane 1,3-diol, 2,2,4-trimethylpentane diol, 2-ethylhexane 1,3-diol, dipropylene glycol, polypropylene glycols, dibutylene glycol, polybutylene glycols, bisphenol A, tetrabromo-bisphenol A, glycerol, trimethylol propane, hexane 1,2,6-triol-butane 1,2,4-triol, pentaerythritol, quinitol, mannitol, sorbitol, methylglycoside and 4,3,6-dianhydrohexitols.

Suitable polyether polyols include the polyethers conventionally used in polyurethane chemistry, such as, e.g., the addition or co-addition compounds of tetrahydrofuran, styrene oxide, ethylene oxide, propylene oxide, butylene oxides or of epichlorohydrin, more particularly of ethylene oxide and/or propylene oxide prepared using divalent to hexavalent starter molecules such as water or the above-mentioned polyols or amines having 1–4 NH bonds.

Examples of suitable polyester polyols include reaction products of polyhydric, preferably dihydric and optionally also trihydric alcohols with polybasic, preferably dibasic carboxylic acids. Instead of free polycarboxylic acids it is also possible to use the corresponding polycarboxylic acid anhydrides or corresponding polycarboxylic acid esters of low alcohols or mixtures thereof for the preparation of the polyesters. The polycarboxylic acids may be aliphatic, cycloaliphatic, aromatic and/or heterocyclic and optionally substituted, e.g., by halogen atoms, and/or unsaturated.

Examples thereof include:

Adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylene tetrahydrophthalic anhydride, maleic anhydride, maleic acid, fumaric acid, dimeric and trimeric fatty acids such as oleic acid, optionally in mixture with monomeric fatty acids, dimethyl terephthalate, terephthalic acid bis glycol ester.

Suitable polyhydric alcohols include the above-mentioned polyols.

Suitable polycarbonate polyols may be obtained by reaction of carbonic acid derivatives, e.g., diphenyl carbonate or phosgene, with diols. Examples of such diols include ethylene glycol, triethylene glycol, tetraethylene glycol, propane 1,2- and 1,3-diol, butane 1,4- and 1,3-diol, pentane 1,5-diol, hexane 1,6-diol, octane 1,8-diol, neopentyl glycol, 1,4-bis(hydroxymethyl)cyclohexane, bis(hydroxymethyl)tricyclo[5.2.1.0$^{2,6}$] decane or 1,4-bis(2-hydroxyethoxy)benzene, 2-methylpropane 1,3-diol, 2,2,4-trimethylpentane diol, dipropylene glycol, polypropylene glycols, dibutylene glycol, polybutylene glycols, bisphenol A, tetrabromo-bisphenol A, or mixtures of the diols mentioned. The diol component preferably contains 40 to 100 wt. % of hexane diol, preferably hexane 1,6-diol and/or hexane diol derivatives, preferably those which, apart from terminal OH groups, have ether or ester groups, e.g., products which were obtained by reaction of 1 mole of hexane diol with at least one mole, preferably 1 to 2 mole of caprolactone according to DE-A 1 770 245, or by etherification of hexane diol with itself to the di- or trihexylene glycol. The preparation of such derivatives is known, e.g., from DE-A 1 570 540. The polyether polycarbonate diols described in DE-A 3 717 060 may also be used.

The hydroxypolycarbonates should be substantially linear. They may also, however, be slightly branched, optionally by the incorporation of polyfunctional components, particularly low molecular weight polyols. Examples of components suitable for this purpose include trimethylolpropane, hexane 1,2,6-triol, glycerol, butane 1,2,4-triol, pentaerythritol, quinitol, mannitol, sorbitol, methylglycoside and 4,3,6-dianhydrohexitols.

Substances used most particularly preferably are propylene oxide polyethers having, on average, 2 to 3 hydroxyl groups and which contain up to a maximum of 50 wt. % of incorporated polyethylene oxide units with average molecular weights between 200 and 9000 and/or difunctional tetrahydrofuran-polyethers with average molecular weights between 200 and 4000 and/or polypropylene oxide polyethers with a total degree of unsaturation of at most 0.04 meq/g and an average molecular weight calculated from the OH content and functionality from 2000 to 12000.

The polyether polyols with a low degree of unsaturation which may be used particularly preferably according to the invention are known, in principle, and are described by way of example in DE-A 1 984 817 (PCT/99/07883) and the publications cited therein. The key to the preparation of such polyether polyols with a low degree of unsaturation is catalysis with metal cyanides.

The preparation of component A) takes place preferably by reaction of the polyisocyanate a) containing uretidione and/or oxadiazine trione with the polyhydroxyl compounds c) mentioned at about 40° C. to 100° C., an NCO/OH ratio from 1.5:1 to 5:1, preferably 1.7:1 to 4:1 being obtained.

If other polyisocyanates b) are used these may, if they are difunctional types, be used for preliminary extension of the polyhydroxyl compounds c). Higher functionality types are used preferably in mixture with a) or added afterwards. In order to obtain the optimum processing viscosity from 20,000 to 40,000 mPas at 20° C., the component A) may be mixed with up to 30 wt. %, preferably up to 20 wt. %, based on the NCO prepolymer, of organic solvents such as, for example, methoxypropyl acetate or butyl acetate.

The component B) is composed preferably of more than 80 equivalent %, particularly preferably 100 equivalent %, based on the groups which are reactive towards isocyanate, of compounds corresponding to formula III. Preferred compounds III are compounds which do not dissolve in prepolymer A at temperatures below 50° C. Particularly preferred compounds III include, for example, 1,2-bis(2-hydroxyethoxy)benzene, 1,3-bis(2-hydroxyethoxy)benzene, bis-1,4-(hydroxymethyl)benzene, trans-1,4-bis(hydroxymethyl)cyclohexane, 1,2-bis(4-hydroxycyclohexyl)ethane, bis(4-hydroxycyclohexyl)methane, but-2-yne 1,4-diol. The particularly preferred compound III is 1,4-bis(2-hydroxyethoxy)benzene.

The component B) may be mixed as such directly with the prepolymer in order to prepare the reactive binders. To improve metering, however, it has proved advantageous to mix the normally solid compounds III in a liquid component. Such mixtures are then preferably composed of 20 to 90 wt. %, particularly preferably 30 to 70 wt. % of compounds III and 10 to 80 wt. %, particularly preferably 30 to 70 wt. % of liquid component and 0 to 10 wt. %, preferably 0.1 to 5 wt. % of other additives such as dispersing agents, antisettling agents, catalysts etc. The liquid component may be one of the high molecular weight polyols described above and/or a plasticiser which does not react with isocyanates, and/or any solvent. Examples of such solvents are the conventional paint solvents: esters such as butyl acetate, ether esters such as methoxypropyl acetate, ketones such as acetone and 2-butanone, aromatics such as xylene, toluene or industrial aromatic or aliphatic mixtures or dipolar solvents such as, for example, N-methyl pyrrolidone, N,N-dimethyl acetamide, N,N-dimethyl formamide and dimethyl sulfoxide or mixtures of various solvents.

Solvents are preferred as the liquid component. Toxicologically less critical aliphatic esters or ether esters such as, for example, methoxypropyl acetate or butyl acetate are particularly preferred.

In order to ensure a good surface structure of the film, it has proved to be expedient if the solid compound III is present in a fine dispersion. The preferred particle size distribution is d90=1 to 80 μm and d99=5 to 120 μm, preferably d90=3 to 40 μm and d99=5 to 60 μm. The compound III is then usually incorporated into the liquid component with a dissolver. It is also possible, however, to convert a supersaturated solution of compound m to the desired dispersion by recrystallisation or to disperse the compound III from the melt. Preparation in pearl mills conventionally used in the paint industry is also possible.

The rheological properties and the settling behaviour may be influenced favourably by special additives such as hydrogenated castor oils, polyurea derivatives or special silicas (see J. Beilman, "Lackadditive", Wiley-VCH-Verlag GmbH, 1998). In particular, polymer additives are suitable as dispersing agents. They are composed preferably of chemically different segments which, depending on the structure, either interact with the surface of the particles to be dispersed or contribute to the steric stabilisation thereof as solvated chains. Examples of the functional groups which are able to interact with the pigment or filler particles or with the crystalline compound III in the crosslinker component B according to the invention are carbonyl, amino, sulfate or phosphate groups. Examples of polymer segments which contribute to the stabilisation of the particles are polyethers, polyesters or polyacrylates.

The amount of catalysts used according to the invention, which may be used as a constituent of the component B or as a catalyst solution in any solvent, is 0.001 to 2, preferably 0.005 to 0.5 wt. %, based on the total weight of component A+ component B. Catalysts more particularly preferred within the meaning of the invention are dioctyltin-IV-bis(2-ethylhexylmercaptoacetate), dibutyltin-IV-bis(2-ethylhexylmercaptoacetate) and dimethyltin-IV-bis(2-ethylhexylmercaptoacetate) and latent catalysts of tin or bismuth compounds and mercapto compounds, as described, e.g., in U.S. Pat. No. 4,788,083.

The NCO prepolymer A is generally mixed with the chain extender component B approximately in the ratio of the equivalent weights of these components, although undercuring is advantageous for some applications, so that the equivalent ratio of NCO to OH is generally 0.90 to 1.50, preferably 1.0 to 1.3 according to the invention.

Additives such as, e.g., pigments, UV stabilisers, levelling agents, antioxidants, fillers or blowing agents may be added for the preparation of ready to use reactive compositions.

Paint auxiliaries may be used, of the kind described, for example, in J. Beilman, "Lackadditive", Wiley-VCH-Verlag GmbH, 1998. More particularly, levelling agents and dispersing agents and rheological additives are suitable for the preparation of the compositions according to the invention. For example, additives based on silicone may be used to improve the surface properties. In particular, additives based on polyacrylates are suitable for improving the flow. The Theological properties of the compositions and the settling behaviour of compositions containing fillers and pigments may be favourably influenced by special additives such as hydrogenated castor oils, polyurea derivatives or special silicas.

Paint additives which may be added to the compositions according to the invention may be used in amounts from 0.01 to 5 wt. %, preferably 0.05 to 3 wt. %.

Moreover, flame-retardant additives may be added to the compositions according to the invention. This term means solid or liquid substances, the addition of which brings about an improvement in the fire performance of the cured polymer film. These agents are described, e.g., in Journal of Coated Fabrics 1996, vol. 25, 224 ff. Halogen-free and antimony-free flame retardants are particularly suitable for use in the compositions according to the invention, such as phosphoric or boric acid derivatives, calcium carbonate, aluminum hydroxide, magnesium hydroxide or melamine and melamine derivatives. Melamine and its derivatives such as, for example, melamine borate or melamine isocyanurate is particularly preferred. The flame retardants may be added to the compositions according to the invention in amounts of 2 to 70 wt. %, preferably 5 to 35 wt. %, based on the sum of components A+B.

The reactive compositions according to the invention are processed preferably by knife coating (spread coating) by the direct or reverse roll coating method.

The curing time of the compositions according to the invention is 2 to 18 minutes, preferably 6 to 12 minutes. The short curing time makes it possible to coat at high speed. Naturally, it is possible to produce films with different properties, e.g., an anchor coat, foam coat, intermediate coat or top coat, by means of a specific chemical structure of the NCO prepolymer in each case.

The preparation of, e.g., a reverse roll coating, may take place in the following manner: the reactive composition for the top coat is applied initially to a suitable intermediate support, e.g., a release paper in an amount from about 30 to 100 g/m², the composition is dried in a drying tunnel, the reactive composition for the anchor coat is applied to the dry top coat likewise in an amount from 30 to 100 g/m², the substrate is laminated thereto, the coating is cured in a further drying tunnel at about 120° C. to 190° C., preferably 140° C. to 170° C., and the coated substrate is removed from the release support. Of course, it is also possible to produce only the top coat, intermediate coat or anchor coat by this coating method, and to use other coating systems of the prior art for the other coat.

As mentioned already, the reactive compositions may also be applied immediately to the textile substrate by the direct spread coating method. In this case, the cleavage product-free and low-solvent character of the reactive compositions according to the invention is of great advantage in the preparation of thick flat coatings. In this way, industrial coatings about 0.4 mm thick may be obtained in only one operation with application quantities from 100 to 200 g/m².

If foam layers are to be prepared with the reactive compositions according to the invention, blowing agents and advantageously foam stabilisers are added thereto. Suitable additives are described in, e.g., DE-A 1 794 006 and in U.S. Pat. No. 3,262,805.

EXAMPLES

Prepolymer A1

2000 g (2 equiv.) of polytetrahydrofuran with an average molecular weight of 2000 (Terathane® 2000 DuPont) are reacted initially at 100° C. with 111 g (1 equiv.) of isophorone diisocyanate until the isocyanate bands in the IR spectrum disappear. 671 g of methoxypropyl acetate are then added and the mixture is cooled to 40° C.

193 g (1 equiv.) of Desmodur® N 3400 (Bayer A G, DE) and 380 g (2 equiv.) of 3,5-bis-[6-isocyanatohexyl]-1,3,5-oxadiazine-2,4,6-trione (prepared according to DE-A 1 670 666) are added in one charge and heated to 75° C. until an NCO content of 2.4% is obtained. The prepolymer has a solids content of 80% and a viscosity of 35000 mPas at 23° C. and an isocyanate equivalent weight of 1750 g.

Prepolymer A2

2000 g (2 equiv.) of Desmophen® C200 (linear polyester carbonate diol with an average molecular weight of 2000; Bayer A G DE) are reacted initially at 100° C. with 111 g (1 equiv.) of isophorone diisocyanate and 150 g of methoxypropyl acetate until the isocyanate bands in the IR spectrum disappear. A further 571 g of methoxypropyl acetate are then added and the mixture is cooled to 40° C. 772 g (4 equiv.) of Desmodur® N 3400 (Bayer A G, DE) are then added in one charge and heated to 75° C. until an NCO content of 3.1% is obtained. The prepolymer has a solids content of 80% and an isocyanate equivalent weight of 1355 g.

Prepolymer A3

2000 g (2 equiv.) of polytetrahydrofuran with an average molecular weight of 2000 (Terathane® 2000, DuPont) are reacted initially at 100° C. with 111 g (1 equiv.) of isophorone diisocyanate until the isocyanate bands in the IR spectrum disappear.

683 g of methoxypropyl acetate are then added and the mixture is cooled to 40° C. 579 g (3 equiv.) of Desmodur® N 3400 (Bayer A G, DE) are then added in one charge and heated to 75° C. until an NCO content of 2.4% is obtained. The prepolymer has a solids content of 80% and an isocyanate equivalent weight of 1750 g.

Component B 40 g of 1,4-bis-(2-hydroxyethoxy)benzene with a particle size distribution d90 of 15 μm and d99 of 31 μm are introduced in a dissolver at a maximum temperature of 30° C. into a solution of 0.4 g of dibutyltin dilaurate and 0.4 g of thioglycolic acid 2-ethylhexyl ester in 60 g of methoxypropyl acetate. The dispersion obtained has an OH content of 6.9% and thus an equivalent weight of 248 g.

Example 1

100 g of the prepolymer A1 are mixed with 14.2 g of component B, 1 g of the levelling agent Levacast® Fluid SN (Bayer A G, DE) and 0.5 g of Irganox® 1010 (Ciba Specialities). The mixture has an initial viscosity of about 29000 mPas, measured at 23° C. After application to a release paper in a film thickness of about 100 μm, the mixture is cured by a staged heat treatment (3 min. 120° C. and 3 min. 150° C.). An elastic, homogeneous film with the following mechanical properties is obtained:

| | |
|---|---|
| Modulus (100%) | 3.3 MPa |
| Tensile strength | 10.9 MPa |
| Elongation at break | 470% |
| Ethyl acetate swelling | 187% |
| Melting range | 222–226° C. |

Example 2

100 g of the prepolymer A2 are mixed with 18.3 g of component B, 1 g of the levelling agent Levacast® Fluid SN (Bayer A G, DE) and 0.5 g of Irganox® 1010 (Ciba Specialities). The mixture has an initial viscosity of about 40000 mPas, measured at 23° C. After application to a release paper in a film thickness of about 100 μm, the mixture is cured by a staged heat treatment (3 min. 120° C. and 3 min. 150° C.). An elastic, homogeneous film with the following mechanical properties is obtained:

| | |
|---|---|
| Modulus (100%) | 4.7 MPa |
| Tensile strength | 5.8 MPa |
| Elongation at break | 180% |
| Ethyl acetate swelling | 140% |
| Melting range | 214° C. |

Example 3

100 g of the prepolymer A1 are mixed with 14.2 g of component B, 1 g of the levelling agent Levacast® Fluid SN (Bayer A G, DE) and 0.5 g of Irganox® 1010 (Ciba Specialities). The mixture has an initial viscosity of about 45000 mPas, measured at 23° C. After application to a release paper in a film thickness of about 100 μm, the mixture is cured by a staged heat treatment (3 min. 120° C. and 3 min. 150° C.). An elastic, homogeneous film with the following mechanical properties is obtained:

| | |
|---|---|
| Modulus (100%) | 3.3 MPa |
| Tensile strength | 4.6 MPa |
| Elongation at break | 210% |
| Ethyl acetate swelling | 140% |
| Melting range | 220° C. |

What is claimed is:

1. A polyurethane coating that is the reaction product of
A) an aliphatic, isocyanate-containing prepolymer having an isocyanate content, based on solids, of 1–8 wt. % and a free monomeric diisocyanate content, based on the weight of component A), of less than 2 wt. %, and containing 0.1 to 1.5 moles per 1000 g of prepolymer of a mixture of aliphatically bound uretdione (I) and oxadiazinetrione (II) groups

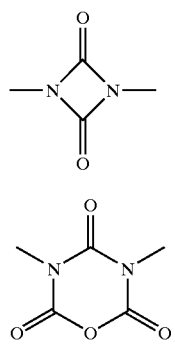

and
B) a polyol component comprising at least 50 equivalent %, based on isocyanate-reactive groups, of a compound corresponding to the formula

   (III)

wherein
Y represents methylene, ethylene, —C≡C—, cyclohexylene-1,4, -1,3, -1,2, or phenylene-1,4, -1,3, -1,2 and
X represents methylene, —OCH₂CH₂— (the oxygen being bound to the Y), or cyclohexylene-1,4, -1,3, -1,2, and wherein the equivalent ratio of the free NCO groups of A) to the isocyanate-reactive groups of B) is 0.90:1 to 1.50:1, and wherein the molar ratio of oxadiazinetrione groups to uretdione groups is from 1:1 to 5:1.

2. The polyurethane coating of claim 1 wherein polyol component B) contains at least 80 equivalent %, based on isocyanate-reactive groups, of 1,4-bis(2-hydroxyethoxy) benzene.

3. The polyurethane coating of claim 1 wherein prepolymer A) has a monomeric diisocyanate content of less than 0.5 wt. %.

4. The polyurethane coating of claim 2 wherein prepolymer A) has a monomeric diisocyanate content of less than 0.5 wt. %.

5. The polyurethane coating of claim 1 wherein uretdione groups and oxadiazinetrione groups are present at a molar ratio of oxadiazinetrione groups to uretdione groups of 2.0:1 to 4.0:1.

6. The polyurethane coating of claim 2 wherein uretdione groups and oxadiazinetrione groups are present at a molar ratio of oxadiazinetrione groups to uretdione groups of 2.0:1 to 4.0:1.

7. The polyurethane coating of claim 3 wherein uretdione groups and oxadiazinetrione groups are present at a molar ratio of oxadiazinetrione groups to uretdione groups of 2.0:1 to 4.0:1.

8. The polyurethane coating of claim 4 wherein uretdione groups and oxadiazinetrione groups are present at a molar ratio of oxadiazinetrione groups to uretdione groups of 2.0:1 to 4.0:1.

9. The polyurethane coating of claim 1 wherein the uretdione groups and oxadiazinetrione groups are incorporated into the prepolymer from a polyisocyanate containing uretdione groups prepared from hexamethylene diisocyanate and from a polyisocyanate containing oxadiazinetrione groups prepared from hexamethylene diisocyanate.

10. The polyurethane coating of claim 2 wherein the uretdione groups and oxadiazinetrione groups are incorporated into the prepolymer from a polyisocyanate containing uretdione groups prepared from hexamethylene diisocyanate and from a polyisocyanate containing oxadiazinetrione groups prepared from hexamethylene diisocyanate.

11. The polyurethane coating of claim 3 wherein the uretdione groups and oxadiazinetrione groups are incorporated into the prepolymer from a polyisocyanate containing uretdione groups prepared from hexamethylene diisocyanate and from a polyisocyanate containing oxadiazinetrione groups prepared from hexamethylene diisocyanate.

12. The polyurethane coating of claim 4 wherein the uretdione groups and oxadiazinetrione groups are incorporated into the prepolymer from a polyisocyanate containing uretdione groups prepared from hexamethylene diisocyanate and from a polyisocyanate containing oxadiazinetrione groups prepared from hexamethylene diisocyanate.

13. A process for coating textile or leather which comprises applying a mixture comprising components A) and B) of claim 1 to a textile or leather by knife coating or casting and allowing the coating to cure.

14. A textile or leather coated with the polyurethane coating of claim 1.

* * * * *